United States Patent [11] 3,579,864

[72] Inventors  Sheldon Littwin
                38-21 Garvey Place, Fairlawn, N.J. 07410;
                Alexander Schure, 257 Wheatley Road, Old
                Westbury, N.Y. 11568
[21] Appl. No.  804,150
[22] Filed      Mar. 4, 1969
[45] Patented   May 25, 1971

[54] TEACHING DEVICE
     14 Claims, 14 Drawing Figs.
[52] U.S. Cl. .................................................... 35/9
[51] Int. Cl. .................................................. G09b 7/06
[50] Field of Search .................................... 35/8, 9, 9.1,
                                                        31.3, 35.4

[56]            References Cited
            UNITED STATES PATENTS
1,617,272  2/1927  Peterson et al. .............  35/9(.1)
3,206,871  9/1965  Schure et al. .................  35/9
3,221,420  12/1965 Heinberg ......................  35/35(.3)
3,248,050  4/1966  Dickson ........................  35/9X
3,251,141  5/1966  MacRae ........................  35/9

Primary Examiner—Wm. H. Grieb
Attorney—Hopgood and Calimafde

ABSTRACT: A response display system which is compatible to data processing and computer systems is described.
The device displays information as the result of a particular inquiry such as in a learning system, teaching system, a game, or a directory. The display employs a multiple-leaf answer response sheet. An intermediate surface on the answer sheet is provided with response characters which are ordinarily concealed but may be silhouetted upon illumination by lamps placed in selected registration with the response characters. A matrix device is used to key punch data processing cards. Several embodiments are shown.

PATENTED MAY 25 1971

INVENTORS
ALEXANDER SCHURE
SHELDON LITTWIN
BY
Sandoe, Hopgood & Calimafde
ATTORNEYS

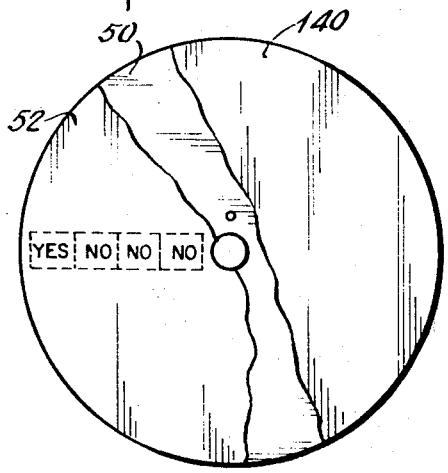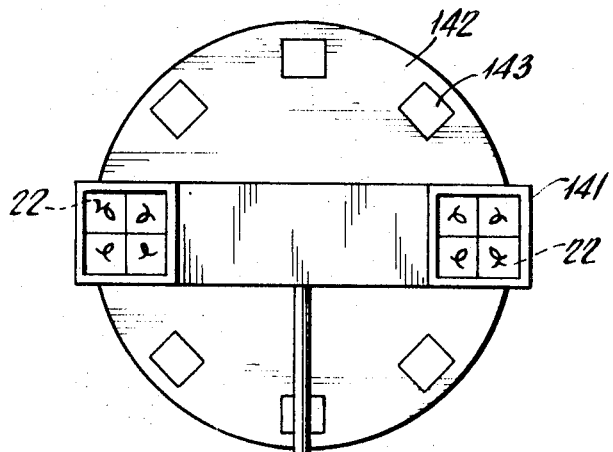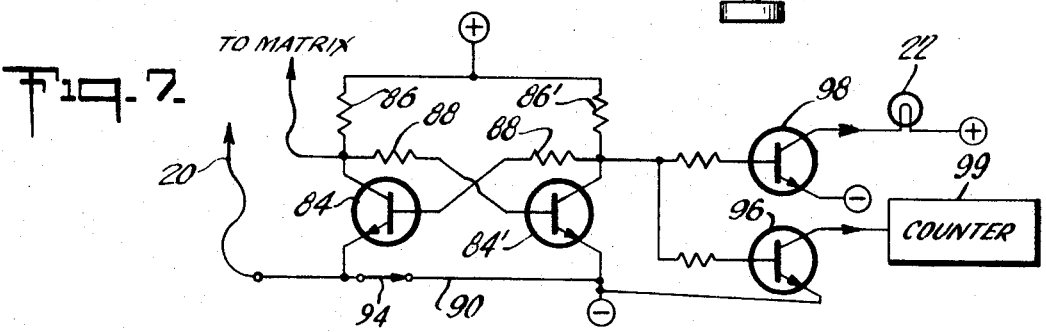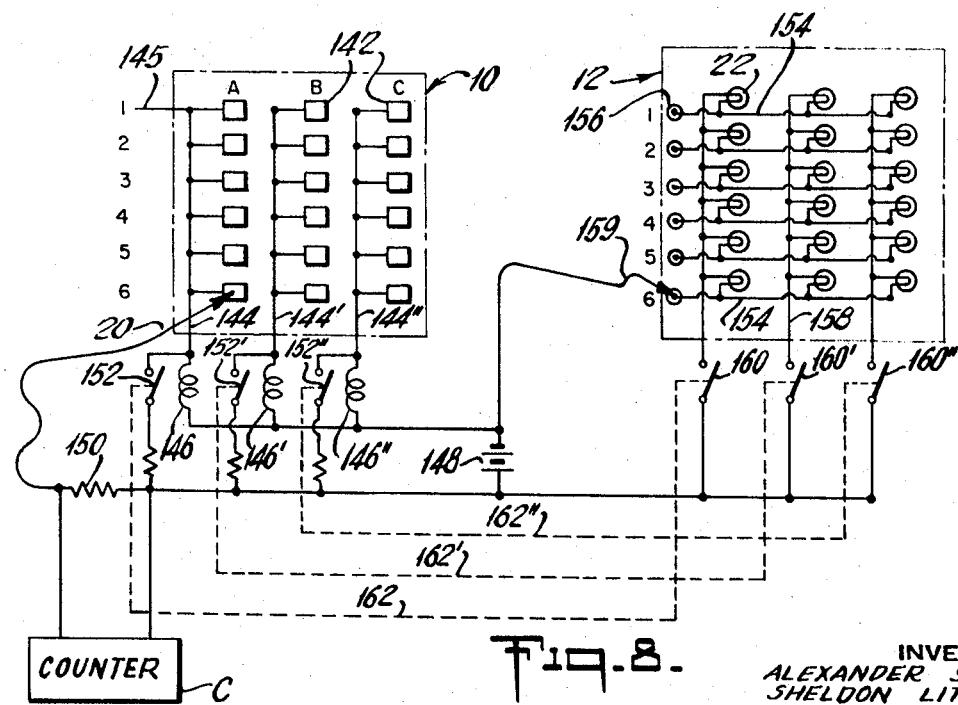

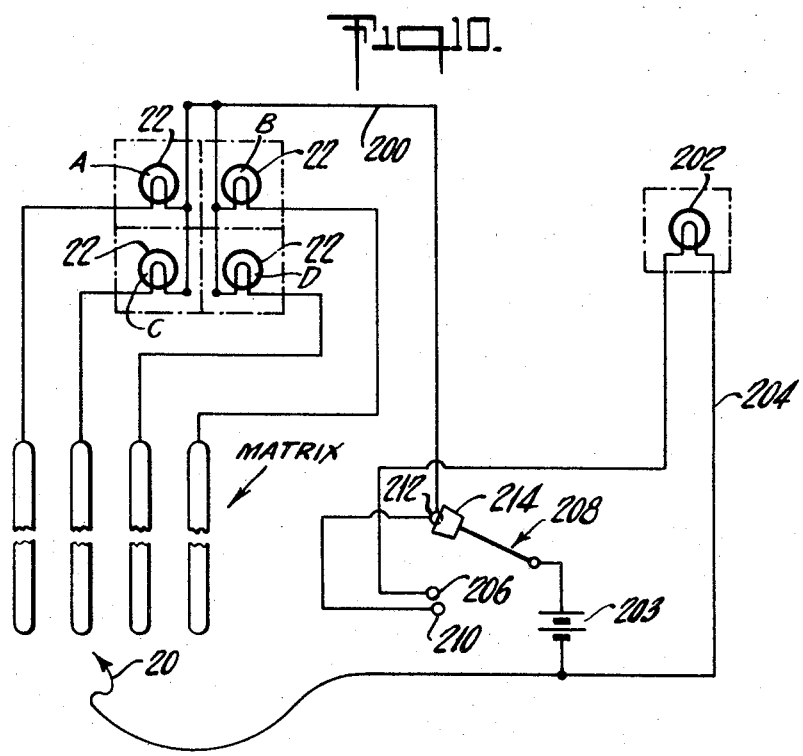

TEACHING DEVICE

This invention relates to a device which displays information as the result of a particular inquiry. More specifically this invention relates to a teaching or a learning system wherein a student may advance through a learning course at his own learning speed.

In the well-known field of programmed learning, such as described in our U.S. Pat. No. 3,206,871, a need exists to provide a display device which provides a visual response to an answered question. Also, in the general field of display systems such as directories, a simple versatile display is of significant value.

The response display device of this invention includes a multiple leaf response or answer sheet having on an intermediate surface normally concealed silhouettable information. By selectively illuminating the multiple leaf, different response may be prominently displayed.

In a typical response display device according to our invention the depression of a selected switch, corresponding for instance to a particular question, will result in the illuminated display of information in response to the question. This type of device is particularly useful for road maps, directories and the like, where the display of the proper route to a particular destination is desired.

The invention is further of great use in the collection of response data in connection with the permanent recordation of answers to questions.

In the case of the use of the invention in a teaching system, student scores are collected on data processing cards at the same time that the student's answer is displayed. These cards are selected to be compatible with computer data processing equipment so that many such student response cards can be scored automatically in relation to each other. This data processing is useful to analyze the student raw score as well as the mean, mode, median, standard error and standard deviation of the scores of many students.

It is therefore an object of this invention to provide a display device for displaying answers to questions.

It is further an object of this invention to provide a question—response system wherein a visual display of the response to the question is provided at the same time a permanent record of the response is made.

It is a further object of this invention to provide a learning system wherein a student may progress through a course at a rate determined entirely by his own speed of comprehension of the subject matter.

It is still a further object of this invention to provide a learning system wherein a visual display of a student's response is provided simultaneously with a permanent recording of the student's response for analysis.

The above-mentioned and other features and objects of this invention and the manner of attaining them will become more apparent and the invention itself will best be understood by reference to the following description of embodiments of the invention, taken in conjunction with the following drawings, the description of which follows:

FIG. 1A is a fragmentary cross-sectional view illustrating the arrangement of the multiple-leaf sheet and the lamp of the system of FIG. 1;

FIG. 1B is a fragmentary cross-sectional view of the indexing mechanism of the system of FIG. 1;

FIG. 5 is a broken plan view of a multiple-leaf answer sheet used with the embodiment of FIG. 4;

FIG. 6 is a front view of still another embodiment of our invention;

FIG. 7 is an electrical schematic of an electronic latching circuit used with our invention;

FIG. 8 is an electrical schematic of a programmed learning system.

FIG. 10 is a schematic diagram of display circuit that may be used with the device of FIG. 6.

Briefly stated, our invention contemplates the use of a multiple-leaf answer sheet which is provided with normally concealed but silhouettable answer characters on an intermediate surface with the characters being revealable by the use of lamps located in registration with the characters to reveal the selected answer.

Figure 1:
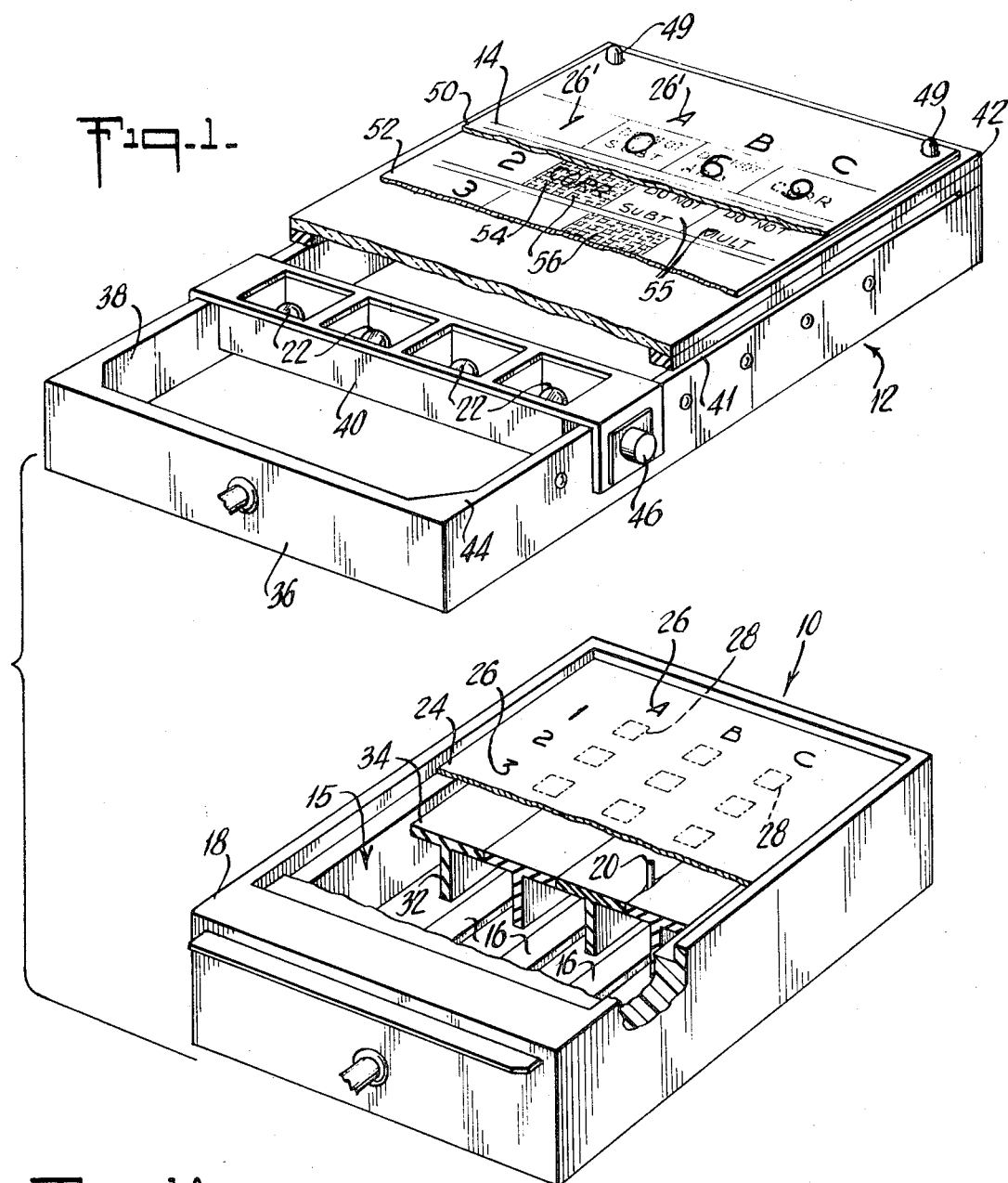
FIG. 1 is a perspective broken view of a programmed learning system employing our invention.

In the learning system as depicted by the embodiment of FIG. 1, two basic components are used, i.e. a permanent record-forming device 10 for permanently recording an answer selected by the student in response to a question, and a display master 12 which reveals, by the use of a multiple-leaf answer sheet 14, a silhouetted answer in response to the student's selection. The permanent recorder may be, for instance, as described in our U.S. Pat. No. 3,206,871. In the latter patent, and as repeated in FIG. 1, we have provided an answer matrix 15 composed of a plurality of longitudinal electrically conducting bars 16 which lie on the bottom of a recording box 18. The conducting bars 16 form an electrical master matrix in a circuit including a student-manipulated probe and lamps 22 located in a display master. Overlying the electrical master matrix 15 is a card 24 having printed thereon question characters 26 corresponding to a question to be answered and a plurality of prescored answer areas such as 28 arranged in selected registration with the question characters 26 and the matrix 15. The card 24 preferably is selected to be compatible with available data processing equipments so that answers may be permanently recorded thereon by selective perforation of the card as described in our patent. The student, in answering a question stated in a specially provided learning course for the subject under study, will select an answer by piercing one of the prescored areas 28, causing the prescored portion to separate from the card and at the same time making electrical contact with an underlying conducting bar 16. In the recording box 18, the conductor bars 16 are isolated from one another by adjacently spaced T-shaped rubber liners having their stems such as 32 located generally midway between the conductor bars 16 and with the crossbar sections such as 34 contacting one another generally midway over the conductor bars 16. Accordingly, when the student has penetrated a prescored area to record his answer, his probe will separate the rubber liners, which yield resiliently at the seam, permitting the probe to contact the underlying conductor bar as well as permitting the severed portion of the card to tumble down into the channel formed between adjacent T-shaped rubber bars. The severed card section may, by suitably inclining the recorder box, slide down to a receiving section located near a lower end of the box 18. This latter receiving section is not shown in the drawing. The display master 12 used in the embodiment of FIG. 1 comprises a generally rectangular housing 36 having an opening 38 on the top surface thereof and a slide 40 for supporting lamps 22 aligned in a selected registration as will be described. The lamps 22 are connected by flexible wires, permitting the slide to move longitudinally along the display master box in a channel 41 formed between a multiple-leaf answer sheet support plate 42 and an upper edge 44 of the display box. The slide 40 is movable along the channel 41 with successive index positions by means of a detent 46 such as shown in FIG. 1B and which is mounted to a downward-extending arm of the slide.

The multiple-leaf sheet support plate 42 is of a transparent material such as opal-colored glass, and is suspended above the upper edge of the display box by suitable stud spacers 49 located at the corners of the plate 42 and thus forming the desired channel 41 for the slide 40. Over the plate 42 is placed the multiple-leaf sheet 14 in accordance with this invention, which comprises an upper leaf 50 and a lower leaf 52 (FIG. 1A). The upper leaf 50 is provided with visible printed characters 26' corresponding to the question and answer characters 26 on the card 24 and defining rows and columns of answer areas. The upper leaf with the visible characters may include, if this is desired, the multiple-choice answers to a question or this may be deleted. The upper and lower leaves 50—52 are provided with suitable apertures which are located in registration with the spacing studs 49 to permit the placement of the multiple-leaf sheet 14 on top of the plate 42 with the answer characters in registration with the lamps on the slide.

The upper leaf 50 shields the lower leaf 52 which, on an intermediate surface 54 located between the two sheets, is provided on answer areas with answer characters such as 55 revealing the correct answers to the questions. These answers 55 are concealed by the upper leaf 50 as is illustrated by the dotted outlines in the answer areas for the question 1. Since the upper leaf 50 is partially broken away, the concealed answers are visible in the view of FIG. 1 for the question labeled 2.

The upper and lower leaves 50—52 forming the multiple-leaf answer sheet 14 are sufficiently thin and transparent so that light passing from the lamps 22 through the glass plate 42 also passes through the sheet 14 to silhouette the answer characters 55 placed on the intermediate surface 54 of the lower leaf 52. For this reason, the normally concealed answers must have sufficient optical density to be silhouettable by the lamps. Since the multiple-leaf sheet 14 is sufficiently transparent to permit revelation of the concealed answer characters 55 by the mere exposure of a source of light on the rear surface of lower leaf 52, it is desirable to include some camouflaging means that restricts observation of the answer characters 55 to a particular display apparatus associated with a desired programmed learning device. Accordingly, the intermediate surface of the lower leaf is provided with camouflaging characters such as arbitrarily oriented lines 56 and which have a selected light wavelength-transmitting characteristic. For instance, by inscribing camouflaging printed characters 56 of a selected color such as red and placing this in random fashion over the answer areas, then the answer characters cannot be observed without employing a like color source of light, such as red, for the silhouetting of the answer characters. The concealed answer characters 55 may then be rendered visible by printing them in a different color from that used for the camouflaging characters. Preferably the answer characters 55 are in black. With the use of the red-colored camouflaging characters, observation of the answer characters may be accomplished either with red-colored lamps 22 or by interposing a red filter 58 between a regular white light source 22 and the multiple-leaf sheet 14. Such latter arrangement is illustrated in FIG. 1a and could be simply employed by incorporating within the multiple-leaf sheet a third leaf made of transparent red material. Regardless of the particular approach used for illuminating the multiple-leaf sheet with a red light, the camouflaging characters will generally freely pass the illumination, yet the differently colored answer characters 55 will be suitably silhouetted by the illumination to become visible despite the camouflaged characters.

The operation of the learning system of FIG. 1 commences with the placement of the slide 40 in registration with the first question to be answered. This places the lamps 22 in registration with the answer areas. The lamp in alignment with the question character 26' may be continuously lighted or dispensed with as desired, depending upon whether any information is to be silhouetted. The question is read by the student and supposing the question to be a simple one, such as "how much is three times three?," he may select any of the available answers; zero, six, or nine, corresponding to the answer areas in columns A, B, and C for question 1. If he selects answer A and pierces the card on the record master 10 at the location A for question 1, the corresponding lamp in the display master 12 will be lit up to reveal the answer. This answer, as indicated by the dotted outline, states "Do not subtract," since it is clear that in order to arrive at the answer, he misinterpreted the question and decided to subtract rather than to multiply. It thus can be seen that the wrong answer can be as educationally instructive as the correct answer, in that the student is made aware of the wrong approach he took in answering the question. The explanatory material revealed in answering the question may of course differ substantially from what is shown, which is presented merely for illustration purposes. Also, in answering the question correctly by applying the probe at the answer area corresponding to the column C, additional material may be presented other than the mere statement that he has found the correct answer. For instance, it is possible that in answering this question correctly, the student has revealed a comprehension which could permit him to skip a predetermined number of subsequent steps or questions and this would be presented in the revealed answer by means of an appropriate instruction advising the student to continue with an advanced question.

The plate 42 may be diaphanous, that is translucent or transparent, with the selection being made depending upon the type of illuminating lamps employed. Note that the successive index positions of the slide are in registration with the rows of questions so that the slide may be conveniently positioned to the appropriate question by the student.

Figure 2:
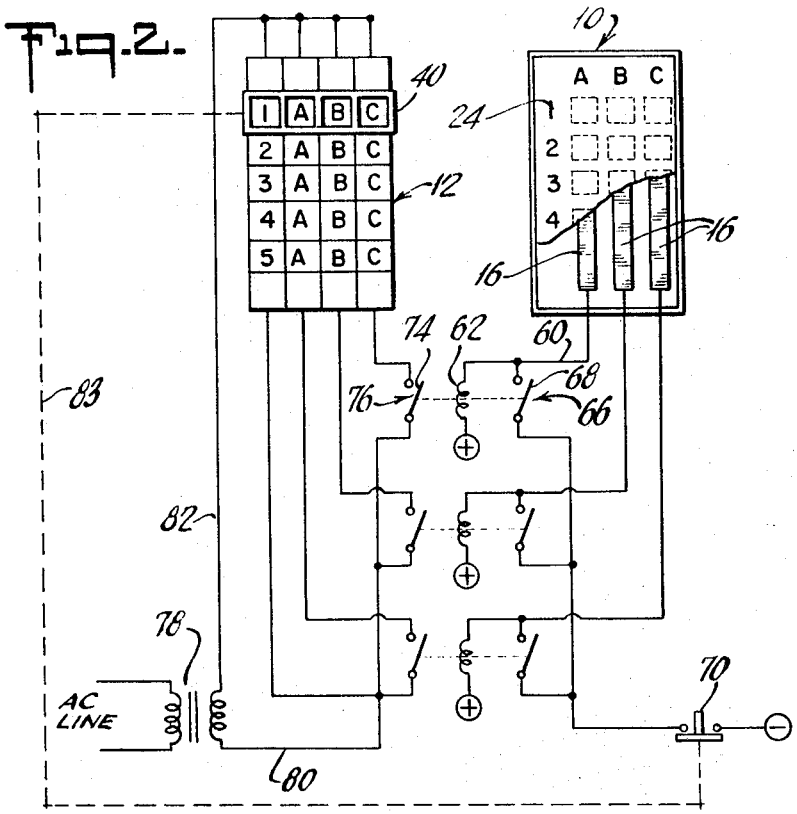
FIG. 2 is a schematic view of the electrical connections used with the system of FIG. 1.
Figure 2A:
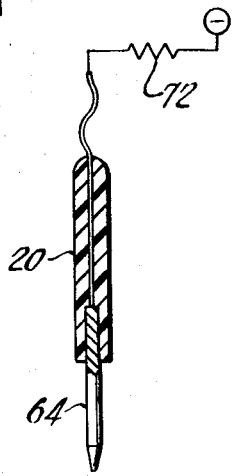
FIG. 2A is a schematic view partly in section of the probe and associated circuitry of the system of FIG. 1.

In FIG. 2, the electrical schematic arrangement is illustrated where the display master 12 is schematically represented by a sheet with question characters and answer areas respectively labeled A, B and C. The card 24 located on the record master 10 is shown also with the question characters and columns labeled A, B and C, and the conducting bars 16 are illustrated to show how a typical electrical connection may be made. Typically, it is desired, as the student selects an answer, that a latching relay be employed to maintain a lamp turned on even after the probe has been removed from a conducting bus bar 16. Furthermore, the lamps 22 used as shown with the schematic of FIG. 2 use an AC voltage source. Typically, the column A conducting bar 16 is connected by a lead 60 to one end of a relay coil 62 which has the other end connected to a positive terminal of a DC supply, not shown in the FIG. The probe 20 has an electrical conducting end 64 connected to the return terminal of the DC supply, i.e. the ground terminal, so that upon the contacting of the probe conducting end 64 with a conducting bar 16, a circuit is completed which energizes the relay. A latching or stick circuit 66 is employed with the relay 62 wherein the energization of the relay closes the contact 68 of stick circuit 66 which thereby maintains electrical current flowing through the relay coil 62. A normally closed pushbutton switch 70 interconnects line 60 to ground. Hence, unless the normally closed pushbutton switch is opened, the relay 62 will remain energized. Note that a resistor 72 is employed in series with the probe 20 to avoid excessive shorting currents upon contacting of a conductor 16.

Energization of the relay 62 will also cause the closing of a contact 74 on a switch 76 placed in series between an AC power source 78 and the lamps 22. The AC power source is obtained by a conventional transformer which steps down the 110 volts AC line voltage to 80 volts AC for longer lamp life and isolation (shock). The lamps are illuminated by a lead 80 connected to one of the contacts on the switch 76 and a return lead 82 coupled to one side of lamps 22. The other side of the switch 76 is connected to a lamp 22. As a result, the energization of the relay 62 by the insertion of probe 20 into a prescored area on the card causes the lighting of a lamp 22 in correspondence with the pierced area on the card 24. It is to be realized, of course, that the mechanical relay function employed may be replaced with a DC solid state relay feature such as shown schematically in FIG. 7.

Preferably the operation of the switch 70 is dependent upon the motion of the slide 40. In other words, the switch 70 is temporarily opened each time the slide 40 is moved to a new detented position. Dashed line 83 illustrates this ganged relationship.

The lamp in the display master, instead of being powered by an AC source, could be driven by a DC source. In such case, a flip-flop (see FIG. 7) is provided with a pair of transistors 84—84' connected in the manner shown in FIG. 7, and which is powered by a DC supply, not shown, supplying current through collector resistors 86—86' to the collectors of the transistors. The emitters of the transistors are shown connected to a ground terminal 90 and each base of a transistor is coupled through a resistors such as 88 to the collector of the other transistor. The emitter of transistor 84 is connected to a ground through a normally closed reset switch 94. Opening of switch 94 forces transistor 84' to conduct. The probe 20 being normally connected to the ground terminal 90 through switch 94 contacts the conducting bars 16 which are electrically connected to the collector of, say, transistor 86. Coupled to the collector of transistor 84' are two output transistors 96 and 98. Transistors 96—98 conduct when transistor 84' is in the nonconducting state and vice versa. Transistor 98 drives a display lamp 22 and transistor 96 drives a counter or stepping switch 99. Counter or stepping switch 99 is used to advance by one, the lighting of the lamps indicating the questions to be answered.

In the operation of the flip-flop of FIG. 7, the circuit is first set in a particular state by grounding the reset line by closing the normally open pushbutton switch 94, thus causing the transistor 84 to be cut off and the transistor 84' to be rendered conducting. The conducting state of the latter transistor 84' forces transistors 96—98 to be in their off position, since they have their base coupled to the collector of the transistor 84'. After the reset is performed, the contacting by the probe of a conducting bar reverses the flip-flop, thereby rendering the transistor 84' nonconducting and supplying a positive voltage drive to the lamp-driving transistor 96.

Figure 3:
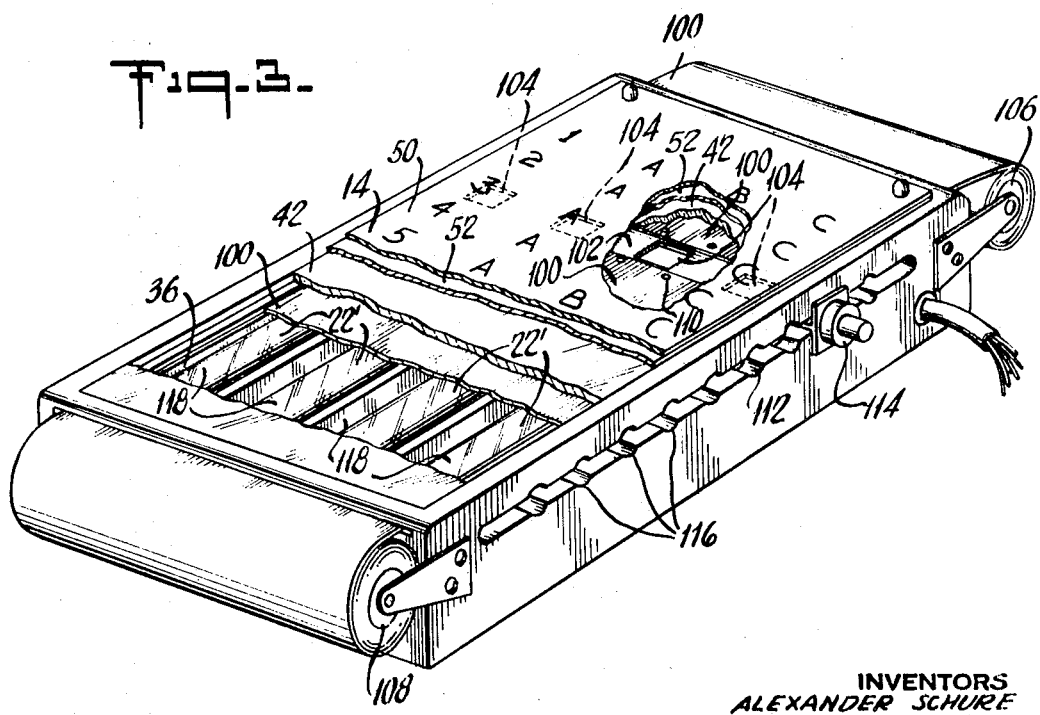
FIG. 3 is a perspective view of a first slide display master in accordance with our invention.

FIG. 3 illustrates a roll display master embodiment in place of the display master of FIG. 1 wherein again a display box is provided having a top opening 36 over which a multiple-leaf sheet support 42 of diaphanous material is provided, and a plurality of "showcase" lamps 22' longitudinally extend parallel and in registration with the columns of a multiple-leaf answer sheet 14. The multiple-leaf sheet 14 is placed on the diaphanous plate 42 and below the sheet 14 is placed a movable mask 100 and slide 102. The mask may be of a feltlike material and is optically opaque except for a row of apertures 104 arranged in registration with the answer characters on the multiple-leaf sheet 14. The mask 100 is affixed to a freely rotatable roller 106 at one end of the display master and also affixed to a second roller 108 located at the opposite end of the display master 12. The second roller 108 is spring-loaded with sufficient tension to keep the mask flat and facilitate movement of the mask 100 under the overlying multiple-leaf answer sheet. The multiple-leaf answer sheet 14 again comprises several leaves generally as described for the display master of FIG. 1, and the apertures in the slide are shown in registration with the question and answer areas. The apertures are shown with lettering therein which of course may vary depending upon the type of sheet employed. The slide itself is affixed to the mask by tabs 110 and rides in a pair of slots 112 (only one of which is visible in the view of FIG. 3) located in side surfaces of the display master box. A push-to-release mechanism 114 is employed which frictionally engages the slide 102 in the slot 112 to normally hold the slide at any desired location along the slot. Indexing positions such as 116 along the slot are provided and are located in alignment with the question rows on the multiple-leaf sheet. The sheet 14 is therefore positioned over the diaphanous plate 42 in a selected registration manner by suitable locating tabs provided therefor on the plate. The advantage of the slidable display master of FIG. 3 resides in the employment of a plurality of longitudinal showcase lamps 22' which need not be moved relative to the multiple-leaf answer sheet 14. The lamps are located in longitudinally separated compartments 118 which are also substantially light-isolated from one another so that the illumination from one lamp will not inadvertently cause the illumination of an adjacent answer area.

Figure 4:
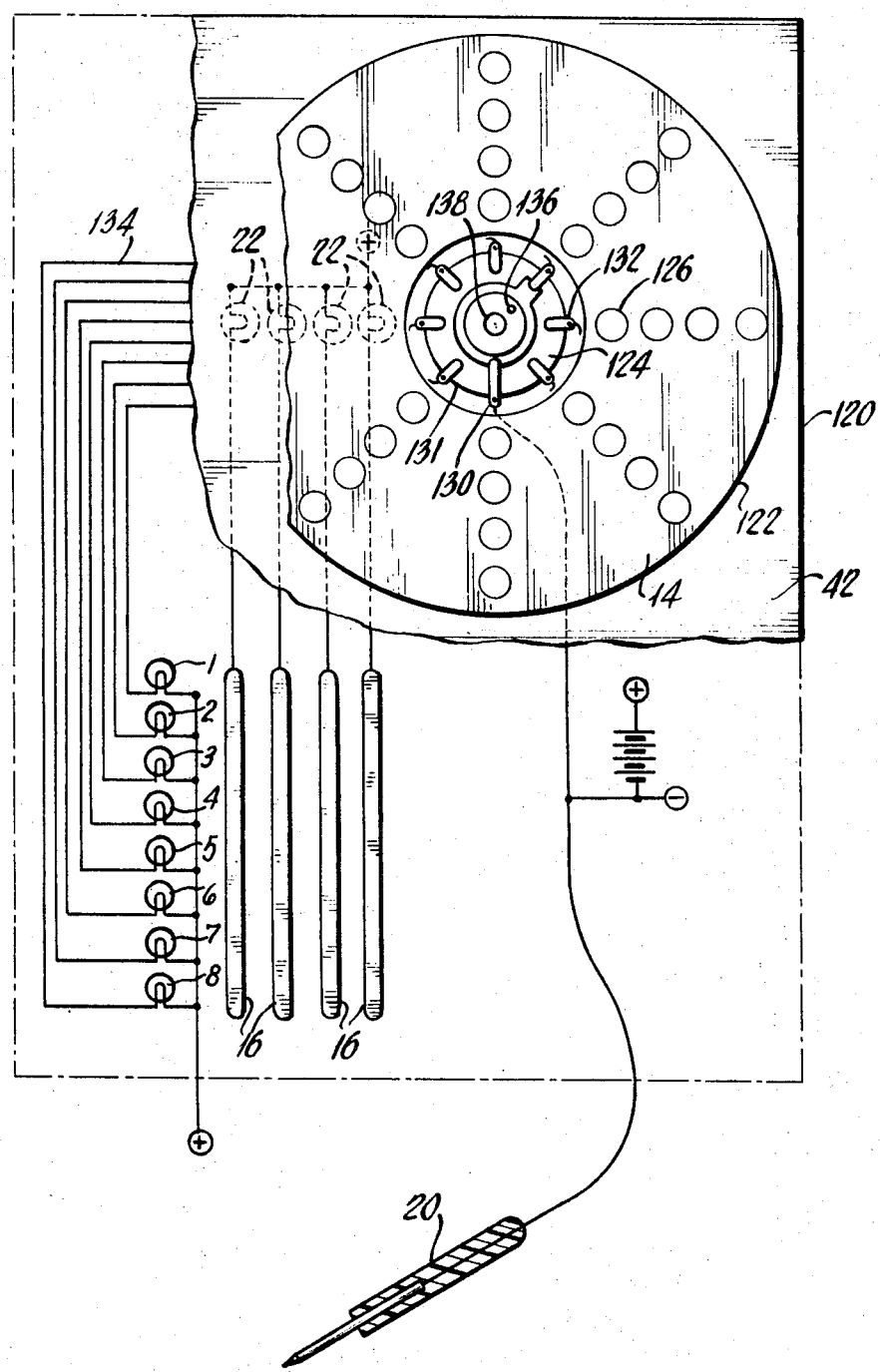
FIG. 4 is a partially broken plan view of a second embodiment of our invention.

FIG. 4 shows a combined record-and-display master 120 with the latter in the form of a wheel 122 in rotational engagement with a multiple-position switch 124. The upper area of the wheel display master 120 is employed to support a circular multiple-leaf answer sheet 14 where now the answer areas are arranged in registration with radially extending lines as indicated by the circles such as 126. In a compartment provided therefor within the wheel display master are arranged a plurality of lamps such as 22 aligned along a radial axis at radial locations corresponding to the answer areas 126 on the multiple-leaf answer sheet 14 so that upon rotation of the multiple-leaf answer sheet 14, the various answer areas are placed in registration with the lamps 22. The lamps are shown connected with one terminal to the positive terminal of a DC supply by the dotted lines 128 and have their other terminals connected to conducting bars 16 located at the bottom end of the wheel master 120. The conducting bars 16 may be arranged in the manner as shown in FIG. 1, so that a probe 20 may contact them through a selected answer area in a card (not shown). The probe 20 is connected to ground and also to a main pole 130 connected on a wafer 131 located on the rotary switch 124. The main pole 130 is rendered alternately in electrical contact with a plurality of radially and circumferentially distributed contacts 132 which are in angular registration with the questions that have to be answered. Each of the contacts 132 is electrically contacted by the leads such as 134 to the lamps labeled 1 through 8. The rotary switch 124 is provided with a radially positioned key 136 and a central projecting spindle 138. The multiple-leaf answer sheet 14 is provided with a spindle-receiving aperture and a key-receiving aperture so that the multiple-leaf answer sheet may be placed on the spindle with its questions in angular alignment with the contacts 132. After mounting of the multiple-leaf answer sheet, a knob (not shown) may be conveniently attached to rotate the switch and the answer sheet in unison and place the proper radially distributed answer areas over the lamps. The student answers the questions by applying the probe in the manner described with respect to FIG. 1. Although the electrical circuitry in FIG. 4 does not include latching circuit features such as described with relation to FIG. 2, it is to be realized that such latching capability may be conveniently included. FIG. 5 discloses the circular multiple-leaf answer sheet 14 used with FIG. 4 in more detail and illustrates a lower leaf 52 having an intermediate surface provided with silhouettable answer characters, an upper leaf 50 for concealing the silhouettable answer characters, and a transparent upper protective cover 140.

FIG. 6 illustrates a frame master 141 device for silhouetting the answers, wherein either a stereoscopic view or a pair of separate views may be obtained. Thus, a wheel 142 may be made with a plurality of angularly distributed distinct answer areas 143 generally located at the radially peripheral end of the wheel 142. Each answer area is further divided into four distinct answers which, upon rotation of the frame, may be placed opposite lamps such as 22. The lamps illuminate the answer areas to silhouette an answer selected by the student utilizing the probe 20 in the manner as described with relation to FIG. 1. In FIG. 6, each answer area is divisible into four distinct answers which may be increased by a factor of two if one considers both the left and the right views. Alternatively the left may be an area for answering questions presented on the right. The view permitted by the frame master 141 greatly enhances the concentration of the student.

FIG. 10 illustrates a circuit which may be conveniently used with the field master device of FIG. 6. Thus lamps 22 are shown respectively labeled A, B, C and D. The lamps 22 are in series connection with a matrix and are connected to a common energizing line 200. A single question illuminating lamp 202 is employed on the right side of the field master. The lamp 202 is connected to a power supply 203 along line 204 and to a contact 206 of a switch 208. Switch 208 is a conventional three-way switch formed of three contacts 206, 210 and 212 with contacts 206 and 210 close together so that the pole 214 may contact both at the same time. By placing the pole 214 on contact 212 only the lamps 22 can be lit. With pole 214 on contact 206 only lamp 202 is lit and with the pole on contacts 206 and 210 the lamp 202 is lit and the lamps 22 may be selectively energized. Lamps 22 of course are lit in response to the application of probe 20 in the manner described with respect to FIG. 1. Latching relays also can be used.

It is further to be realized that the conducting bars 16 shown in use with the recorder master in FIG. 1 may be broken into a plurality of distinct sections. These sections will be aligned to fall into registration with the prescored areas on the card. The display master 12 used with the record master 10 of FIG. 8 may utilize a separate lamp for each of the concealed answer areas. Thus, in the embodiment of FIG. 8, six question lines such as 145 are provided with three answers for each, thus requiring a field array of 18 lamps, one of which is to be turned on upon the selection of an answer by the student. The conductor bar sections such as 142 are aligned in registration with the answer areas of a card. Each section is made extremely small, practically commensurate in size with a prescored area 28. With such conductor bar sections 142 one can, in a convenient manner, make it quite difficult for a student to relate any particular conductor bar section with a question when there is no card 24 present in the record master 10. In the arrangement of FIG. 8, each of the conductor bar sections in columnar alignment are electrically connected at lines 144, 144', 144'' to one terminal of relay coils 146', 146'', 146 which have their other terminals connected together to the negative terminal of a DC supply 148. The conductor bar contacting probe 20 is connected through a current limiting resistor 150 to the positive terminal of supply 148. Latching circuits 152, 152', 152'' are used across the relay coils 146, 146', 146'' to maintain current flowing through the coils even when probe 20 is removed from a conductor bar section 142.

On the display master 12 the plurality of lamps 22 are connected in rows and columns in registration with answer areas of the multiple-leaf answer sheet. The row lines such as 154 connect to suitable contact points 156 which may be a standard phone jack or the like. A display contacting probe 159 is connected to the negative terminal of the supply 148 and fits into the contacts 156. The lamp column lines such as 158 connect to switches 160, 160', 160'' which are respectively controlled by the relay coils 146, 146', 146'' as indicated by dashed lines 162, 162', 162''. The display contacting probe 159 may be selectively connected to any one of six question bus bars or rows 154 at the contact points 156 provided therefor.

In the operation of the electrical mechanism of FIG. 8 one would, for instance, place the display contacting probe 159 in electrical contact with the bus bar 154 for the question 6 and place the probe 20 in contact with the "A" conductor bar section of question 6 of the record master 10.

Upon contact of the probe 20 with a conductor bar section, an electrical circuit is completed from the positive terminal of supply 148 through the coil 146 to the negative terminal. Consequently the relay coil is energized and causes a closing of the latch circuit 152 and the switch 160. Closing of switch 160 completes a circuit from the negative terminal of the DC supply through probe 159, through the "A" lamp 22 of question 6 on the display master 12 and through switch 160 to the positive terminal of supply 148. Thus the "A" lamp of question 6 on the display master is lit to reveal silhouetted answers and stays lit until probe 159 is removed from its contact 156.

Figure 9:
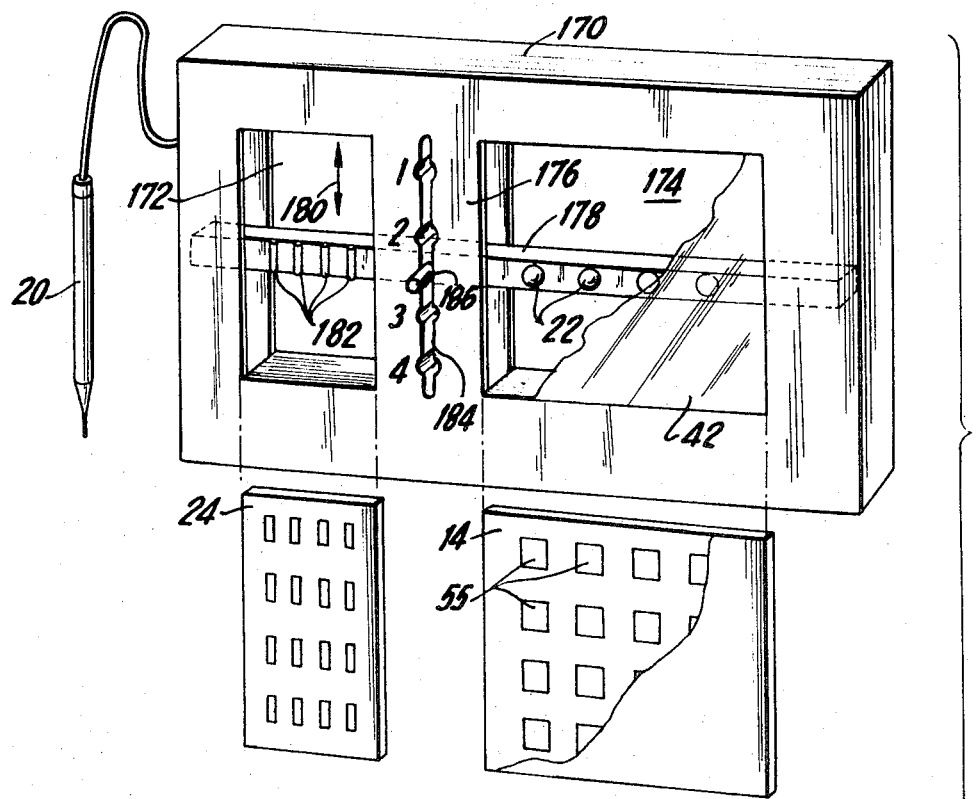
FIGS. 9 and 9a are partial perspective and plan views of respectively another slide master and a plate master made in accordance with the invention.

In FIG. 9 another slide master is shown wherein the matrix is moved in unison with the display lamps to provide a simplified reinforced learning system.

A rectangular housing 170 is provided having a matrix-receiving rectangular aperture 172 and a display lamp-receiving rectangular aperture 174 adjacently located but separated by a slotted divider 176. A matrix and display lamp-mounting bar 178 is mounted with freely slidable motion in the direction as indicated by a double-headed arrow 180. The bar 178 spans the apertures 172 and 174 and is provided with conductor bars 182 in aperture 172 and with lamps 22 in aperture 174. The conductor bars 182 and lamps 22 are electrically connected to one another as in FIG. 2.

The divider 176 has a slot 184 with successive indent locations into which an indent 186 affixed to bar 178 may fit somewhat like the indent positioning employed in FIG. 3.

A card 24 is positionable over the aperture 172 and a multiple-leaf diaphanous supporting plate 42 is positioned over the aperture 174. A multiple-leaf answer sheet 14 is placed over the plate 42 in a manner that places the concealed answer characters in registration with the index positions similar to FIGS. 1 and 3. The device of FIG. 9 operates like the other FIGS. except that the matrix moves in unison with the lamps as the student replies to successive questions.

Figure 9A:
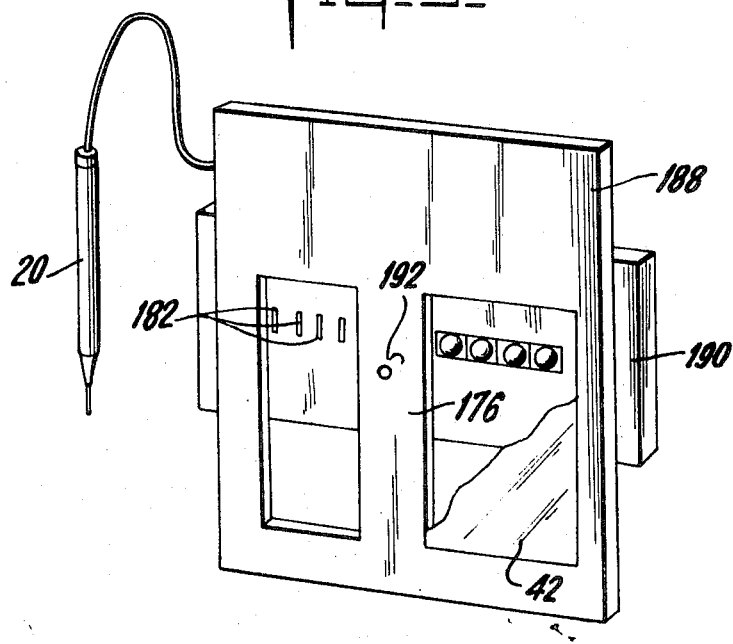

Alternatively, the movements in the device of FIG. 9 may be so arranged that instead of the slide, the housing 170 is moved with the matrix and lamps remaining stationary. FIG. 9a is illustrative to this effect in that a plate 188 is provided which is shaped like the upper part of housing 170 in FIG. 9 but is movable over a fixed baseplate 190 having thereon the matrix 182 and lamps 22. The plate 188 moves with successive indent positions over the baseplate 190 by using an indent 192. Note that the divider 176 in FIG. 9a need not have a slot required with FIG. 9.

While the principles of the invention have been described in connection with specific apparatus, it is to be clearly understood that this description is made only by way of example and not as a limitation to the scope of the invention as set forth in the objects thereof and in the accompanying claims.

We claim:

1. In a system wherein an electrical master matrix is arranged in registration with a card overlying the matrix, said card having printed thereon question characters corresponding to a question to be answered and a plurality of prescored answer areas arranged in selected registration with the question characters, said answer areas to be pierced by an electrically conducting probe selecting an answer to a question to permanently record the chosen answer on the card by severance of a prescored area from the card and electrically contact the underlying matrix, the improvement comprising a housing having located thereon a plurality of light isolated lamps in preselected alignment and a multiple-leaf answer sheet overlying the lamps and being sufficiently thin and transparent to pass light from the lamps therethrough, said sheet having on an intermediate surface concealed silhouettable answer characters corresponding with the answer areas on the card overlying the matrix and with the concealed silhouettable answers in selected registration with the lamps, and means for selectively interconnecting the electrical matrix with the lamps and the probe to illuminate a lamp positioned in registration with a concealed silhouettable answer and reveal the probe selected answer, said multiple-leaf sheet including a top leaf and a bottom leaf, said top leaf being provided with question characters corresponding to a question to be answered and suggested answer characters in general registration with the concealed answers.

2. The device as recited in claim 1 wherein the housing is provided with a recessed slide bar, with the matrix and lamps being mounted to the bar with the bar being slidable along the housing with the matrix in registration below the card and the lamps in registration below the multiple-leaf answer sheet with the bar being movable with successive indent positions corresponding to the questions to be answered and answer characters on the sheet.

3. The device as recited in claim 1 wherein the intermediate surface having said concealed silhouettable answer characters is further provided with camouflaging characters having a selected light wavelength-transmitting characteristic and wherein said lamps provide illumination predominently with said selected light wavelength to observe the concealed silhouettable answers substantially free of said camouflaging characters.

4. The device as recited in claim 1 wherein the intermediate surface is provided with camouflaging characters having a selected light wavelength-transmitting characteristic and a light filtering material placed over the lamps, said light filtering material being chosen to transmit predominently the light of the wavelength of the camouflaging characters to observe the silhouettable answers free of said camouflaging characters.

5. The device as recited in claim 4 wherein the light filtering material is placed between the lamps and the intermediate surface of the multiple-leaf sheet.

6. The device as recited in claim 1 wherein said intermediate surface is further provided with camouflaging characters having a selected color for transmitting predominently light of the same color passing through the multiple-leaf sheet and light means for effectively removing said camouflaging characters and reveal the concealed answers.

7. The device as recited in claim 1 wherein the selective interconnecting means further includes
latching circuit means actuated by the probe contacting of the matrix for retaining illumination of a selected lamp after the probe has been removed from contact with the matrix.

8. The device as recited in claim 1 wherein the housing partially encloses an open-ended chamber with the opening of the chamber opposite the multiple-leaf sheet and a diaphanous multiple-leaf support overlying the opening and selectively spaced from the open end of the chamber to define a slide receiving channel between the housing and the support,
a slide positioned in the channel and spanning the open chamber end and held with detent retention to the housing and being traversable over the chamber opening along the channel with successive index positions, said slide being provided with light isolated recesses spaced at intervals corresponding with concealed silhouettable answers associated with a question and wherein the lamps are mounted in the slide recesses for illuminating the multiple-leaf sheet through the diaphanous support.

9. The device as recited in claim 1 wherein the housing partially encloses an open-ended chamber with the opening of the chamber opposite the multiple-leaf sheet, with the lamps located in the chamber in alignment with concealed silhouettable answers associated with a question, an apertured mask overlying the multiple-leaf sheet and of substantially greater size than the open end of the chamber with the apertures in the mask aligned with the concealed silhouettable answers associated with a question,
a feed roller and a spring-loaded takeup roller with the rollers located at opposite ends of the chamber opening,
with the mask mounted on said rollers to permit relative movement of the mask apertures past the multiple-leaf sheet.

10. The device as recited in claim 9 and further including
a slide guiding groove located in the housing and running along the multiple-leaf sheet between the rollers and an apertured slide affixed to the mask with the mask apertures in registration with the apertures in the slide, and means for slidably retaining the slide within the groove.

11. The device as recited in claim 10 wherein the slidable retaining means includes a detect retention device affixed to the slide for successive index positioning thereof along the groove.

12. The device as recited in claim 1 wherein the housing is provided with a rotary multiple contact switch and a centrally located spindle supporting the switch, said switch being recess mounted in the housing with the contacts angularly distributed about the spindle at selected radial locations, a key affixed at a selected radial and angular location of the spindle and being rotatable therewith, said key and spindle protruding above a surface of the housing,
said multiple-leaf answer sheet being mounted over the switch and over the surface of the housing and provided with a spindle-receiving aperture and a key-receiving aperture to permit mounting over the spindle with selected angular position commensurate with the location of the key, said sheet being rotatable with the spindle of the switch.

13. The device as recited in claim 12 wherein the multiple-leaf sheet is provided at an intermediate surface thereof with concealed silhouettable answer characters arranged in rows extending radially from the spindle aperture with rows of characters being angularly distributed about the spindle aperture and wherein the lamps are arranged in recessed position on the housing along a line extending radially from the spindle.

14. The device as recited in claims 13 wherein the matrix is recess mounted to the housing in selected registration with the lamps.